Patented Feb. 1, 1949

2,460,578

UNITED STATES PATENT OFFICE 2,460,578

SOLUTIONS OF VINYLIDENE CHLORIDE POLYMERS IN AMIDE SOLVENTS

Ray Clyde Houtz, Snyder, N. Y., assignor to E. I. du Pont de Nemours & Company, Wilmington, Del., a corporation of Delaware No Drawing. Application April 1, 1947,
Serial No. 738,729

21 Claims. (Cl. 260—32.6)

This invention relates to new compositions of matter and shaped articles produced therefrom. More particularly, this invention relates to new compositions of matter comprising organic solvent solutions of polyvinylidene chloride, i. e., polymerized vinylidene chloride ($-CH_2CCl_2-$)$_x$ and copolymers and interpolymers of vinylidene chloride and to the production of shaped articles from said organic solvent solutions of said polymers of vinylidene chloride.

Polyvinylidene chloride and copolymers and interpolymers of vinylidene chloride with other polymerizable substances possess desirable physical and chemical properties such as toughness and insolubility and insensitivity to common solvents. However, the vinylidene chloride polymers that are sufficiently high melting to be useful in the formation of synthetic fibers, yarns and films, etc., are difficult to form into these articles because, heretofore, effective solvents have not been readily available, the polymers being insoluble in the commonly used solvents such as acetone, toluene, ethyl acetate, etc. Further, since the polymers are not sufficiently stable at temperatures above their melting points, fabrication by melt-extrusion techniques has been precluded. It has been previously known that solutions could be prepared by dissolving polyvinylidene chloride or copolymers of vinylidene chloride in certain liquid compounds taken from the class of polychlorinated aromatic hydrocarbons, aliphatic, alicyclic, and alkyl-aryl ketones or open-chain or cyclic aliphatic ethers. However, these solvents and the solutions formed therefrom have not proved satisfactory, and it has been the practice in most instances to use interpolymers having low melting points. Accordingly, the high melting point polymers have not been adapted to ready use and the application of melt, solution or plasticizer techniques has been limited to polymers of low molecular weights and low melting points.

The most interesting vinylidene chloride polymers and copolymers (containing 95% or more by weight of vinylidene chloride) are those having a molecular weight in excess of 5,000, a softening point at or above 170° C., and stability at temperatures up to 200° C. The commercial polymers of vinylidene chloride, however, normally consist of copolymers containing 8% to 10% or more of a copolymerizable material. Inclusion of such amounts of other monomers has the disadvantage of lowering the desirable inherent properties of the polymer, such as high softening point, chemical inertness, resistance to solvent action, etc. Furthermore, copolymers of vinylidene chloride having relatively low vinylidene chloride content do not have form stability. For example, oriented yarns made from polymers having 8% to 10% copolymerizable materials retract on heating to a considerably greater extent than do yarns or monofils made from high vinylidene chloride content polymers. Accordingly, it is desired to use the high molecular weight, high softening polymers which have good heat stability.

It is, therefore, an object of this invention to dissolve polyvinylidene chloride and its copolymers in which at least 95% by weight of the polymer is vinylidene chloride in solvents which do not react with nor decompose the polymers and which may be substantially completely removed from structures formed from the resultant solutions, thereby permitting the ready commercialization of the more outstanding polymers of vinylidene chloride.

It is another object of this invention to produce solutions of polyvinylidene chloride or its copolymers in which at least 95% by weight of the polymer is vinylidene chloride in solvents which do not react with nor decompose the polymers, the solutions being suitable for the formation of filaments, yarns, films, and other commercially useful articles.

It is a further object of this invention to produce solutions of polyvinylidene chloride or of copolymers or interpolymers of vinylidene chloride in which at least 95% by weight is vinylidene chloride in volatile organic solvents which solutions are eminently suited for use in the manufacture of shaped articles such as yarns, films, tubes, bristles, ribbons or molded articles.

It is a still further object of this invention to produce shaped articles and structures of polyvinylidene chloride or copolymers or interpolymers of vinylidene chloride in which at least 95% by weight of the polymer is vinylidene chloride.

Other objects will appear hereinafter.

The objects of this invention may be accomplished in general by dissolving polyvinylidene chloride and copolymers or interpolymers of vinylidene chloride which contain at least 95% by weight of vinylidene chloride in an amide of a secondary amine formed by replacing the amine hydrogen with an acyl radical containing at least two carbon atoms.

Many compounds of the following structural classification are useful as solvents. The amides contain the disubstituted carbamyl group

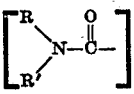

in which the groups R and R' may be aryl, aliphatic or in heterocyclic combination with the nitrogen atom. The unsatisfied carbon valence in the above formula is satisfied by attachment to the group Y which may be an aliphatic, alkoxy alkoxyalkyl, hydroxyalkyl, disubstituted carbamyl or disubstituted amine group. The acyl radical, represented by the group

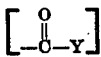

in the complete amide formula

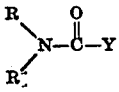

should contain at least two carbon atoms and may be derived from such acids as acetic acid, butyric acid, crotonic acid, lauric acid, methoxyacetic acid, N,N-dimethyl carbamic acid, oxalic acid, adipic acid, benzoic and glycolic acid. When the acyl radical is derived from polybasic acids, all or a portion of the carboxyl groups may be converted to amides by reaction with any of the secondary amines as dimethylamine, diethylamine, methylethylamine, dibutylamine, diphenylamine, piperidine. Preferably, all the carboxylic acid groups are converted to disubstituted carbamyl groups.

In addition to amides described above, it has been found that in general compounds having one or more of the following sulfoxy groups

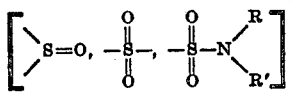

and certain compounds having sulfide or ester groups are capable of dissolving vinylidene chloride polymers containing at least 95% by weight of vinylidene chloride. In reference to these additional solvents, in those compounds containing at least one of the sulfoxy groups shown in the above formulas the unsatisfied sulfur valences may be satisfied by attachment to an alkyl, alkylene or aryl group. The alkylene groups may be in heterocyclic combination with the sulfur atom. Further, a given compound may contain more than one sulfoxy group, as for example, in 2,2-bis(ethylsulfonyl) butane. Accordingly, useful solvents include also straight chain and cyclic sulfoxides, sulfones and sulfonamides. Thus, this invention is not limited to amides of carboxylic acids but may employ non-carboxylic acids such as the sulfonic acids. For example and illustrating compounds having the group

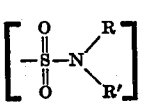

where R is hydrogen, alkyl, or aryl and R' is an alkyl or aryl group, amides of benzenesulfonic acid and p-toluenesulfonic acid prepared from the respective acids using such amines as n-amylamine, ethylamine, piperidine, butylamine, dibutylamine, isobutylamine and the like may be used in preparing the new compositions of matter of this invention.

Representative compounds which come within the scope of the above formulas and definitions and which are suitable for use for the above-mentioned vinylidene chloride polymers include:

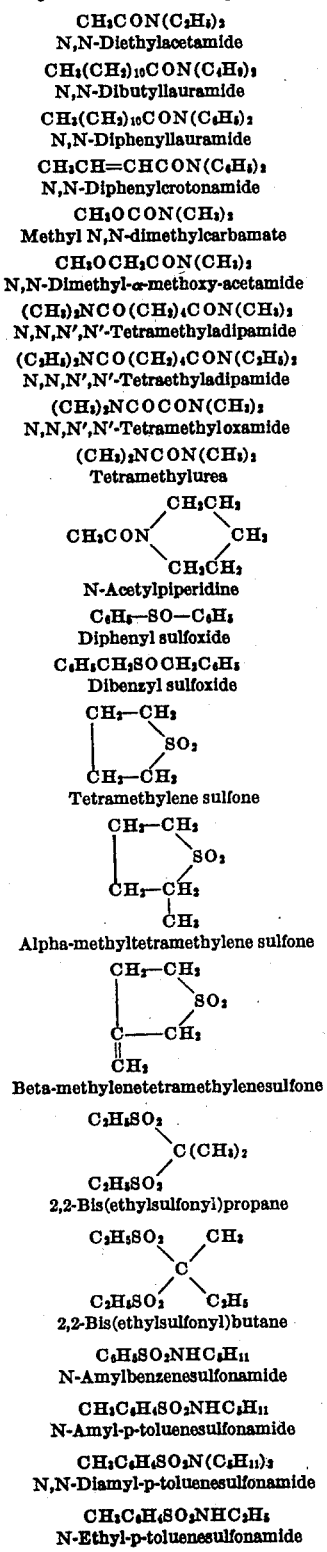

C₄H₉SO₂N(C₄H₉)₂
N,N-Dibutylbenzenesulfonamide

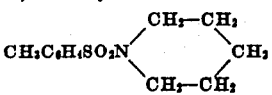
N-(p-Toluenesulfonyl)piperidene

ClC₆H₄SO₂NHC₄H₉
N-Butylchlorobenzenesulfonamide

C₆H₁₁SO₂NHCH₂CH(CH₃)₂
N-Isobutylcyclohexanesulfonamide

Tetramethylene sulfide

1,2-Bis(ethylthio)ethane

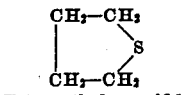
1,3-Dithiolane

NO₂C₆H₄COOC₂H₅
Ethyl o-nitrobenzoate
Ethyl m-nitrobenzoate
Ethyl p-nitrobenzoate The following examples in which parts, proportions and percentages are by weight unless otherwise specified, illustrate preferred methods of preparing solutions in accordance with the principles of this invention and of employing these solutions in the manufacture of commercially satisfactory shaped articles. The invention is not to be limited by the details set forth in the examples.

*Example I*

Forty parts of polyvinylidene chloride polymerized according to the method of E. C. Britton et al., as described in U. S. 2,333,633, are mixed with stirring into 60 parts of tetramethyl urea. A clear viscous solution is formed on heating to 130° C. for 15 minutes with stirring. The solution which has a viscosity of 50 poises is dry spun into a multifilament yarn through a spinneret containing ten holes, each 0.05 m. m. in diameter, into a spinning cell such as that described in U. S. 2,404,714 to George H. Latham. The air to the cell is heated to 150° C., circulates upward counter-current to the filaments and exhausts at 200° C. The walls of the cell are heated to 320° C. After a 9 ft. travel through the cell, the yarn is wound up at a speed of 25 to 50 yards per minute. The filaments are drawn to a stretch ratio of 3.5 to 1 by passing over a driven roll heated to 135° C. This multifilament yarn which has a "zero strength" temperature of 170° C. under a load of 15 lbs. per square inch has a dry tenacity of 2.5 grams per denier and 15% dry elongation. The yarn is set by subjecting it to a temperature of 100° C. for 15 minutes while held at the drawn length, whereupon it has only moderate retraction in boiling water when heated in the relaxed condition. The yarn has a highly desirable lustre, is very insensitive to water, most organic solvents, acids, and alkalies.

This solution may also be extruded onto a chromium plated casting wheel heated to a suitable temperature to form a transparent film. After passing through a suitable drying medium such as a current of warm air, the film may be stripped off the casting wheel and wound up. The film is highly moistureproof and durable at room temperature.

*Example II*

Twenty parts of the vinylidene chloride polymer are dissolved in 80 parts of N-acetyl piperidine by heating and stirring at 100° C. for 30 minutes. The solution is cooled to 90° C. and extruded by a wet spinning process through spinnerets of 0.004 inch hole size into water heated to 90° C. Coagulation is rapid and after a bath passage of 25 inches, the yarn is wound up at the rate of 25 yards per minute on a bobbin. After washing the yarn free of excess solvents, the yarn is dried in a circulating oven heated to 50° C. and drawn to a stretch ratio of 3 to 1 on a roll heated to 120° C. Before drawing, the yarn is opaque but improves in lustre, strength, and toughness on drawing.

*Example III*

Twenty parts of the vinylidene chloride polymer are heated with 80 parts of tetramethylene sulfone to a temperature of 140° C. After 30 minutes of stirring, a clear solution results. This solution is extruded into a coagulating bath consisting of glycerol heated to 120° C. through spinnerets having holes the diameters of which are 0.003 inch. The yarn is drawn through the bath for a distance of 25 inches whereupon it is removed by means of a vertical guide and wound up on a rotating bobbin at the rate of 25 yards per minute. The tension in the spinning bath is maintained at 0.25 gram per denier by suitably designed tension rollers. The yarn is semi-lustrous and has a dry tenacity of 2 grams per denier and an elongation of 15%.

*Example IV*

Fifteen parts of diphenyl sulfoxide and 85 parts of vinylidene chloride polymer are ground together in a Raymond pulverizer to form an intimate mixture. This molding powder is molded into tough flexible bars by heating it in appropriate apparatus to 125° C. under 5,000 lbs. per square inch pressure.

The above mentioned compounds are given to illustrate effective solvogenic groups. This invention is not limited to these specifically named compounds. For example, the various hydrocarbon groups, both aliphatic and aromatic, may be substituted. Permissible substituents include halogen, oxygen, sulfur, ester, hydroxyl, thiol, cyano, thiocyano and sulfoxy groups. Further, the aliphatic groups may contain unsaturated groups. In the main all the above groups are inert toward the polymers. Generally, the unsubstituted, less expensive compounds are preferred, since commercial operations can be carried out smoothly with them at low cost.

If the solvent has a relatively low boiling point (less than about 250° C.), the solution of the particular vinylidene chloride polymer may be formed into a shaped structure, for example, a yarn or film, and the solvent removed from the shaped structure. When the solvent is relatively non-volatile and has a boiling point of about 300° C. or more, shaped articles may be made from the solution and at least a portion of the solvent may be retained therein as a plasticizer for the articles.

The solvents of this invention are miscible in a wide range of proportions with polyvinylidene chloride and copolymers and interpolymers of vinylidene chloride and they do not appear to react with or decompose them. Many of the compounds are also miscible with (soluble in) such non-solvent liquids for the polymeric materials as water, aqueous salt solutions, alcohol, glycerol, etc. Solutions of vinylidene chloride polymer in many of the compounds of this invention can therefore be extruded into such non-solvent liquids to form shaped articles of the polymer, with the solvent being removed by the selective solution in the liquid coagulant. Shaped articles may also be produced by extruding the solution into an evaporative medium which evaporates the solvent. Shaped articles obtained from these solvent solutions are substantially undecomposed and chemically unchanged from the simple polymer prior to its solution. By the use of the new compositions of matter of this invention vinylidene chloride polymers may be shaped in the form of filaments, yarns, films tubes and like structures by apparatus generally known to the art, the detailed operating conditions being suitably modified.

The solvents of this invention are all capable of dissolving polyvinylidene chloride and its copolymers at temperatures below 190° C. and some solvents are capable of forming solutions at room temperature. Many of the solvents dissolve or retain the polymer in clear solutions only at elevated temperatures, for example, temperatures above 100° C. or higher, below which temperatures the composition resembles a gel. In all cases when the polymer is dissolved in a solvent of the above classes, the resulting composition while hot has the appearance of a true solution. When cooled to room temperature, the composition generally takes on the appearance of a gel which gel may, on standing, undergo syneresis. The heating of this gel, synersid, or mass, however, causes it to again return to solution form. Many of the solvents form solutions which gel only very slowly at room temperature and certain of the polymer solutions formed by the use of certain solvents of this invention are stable at room temperature. In the main all compositions of this invention are physically stable at temperatures considerably above room temperature.

Non-solvent softeners such as dibenzyl ether can also be incorporated in the solutions of this invention, these materials remaining in the subsequently formed articles to impart a softening effect. If plasticizing or softening agents are to be used with polyvinylidene chloride, it is preferable to add them in the desired amount to an already formed solution of the polymer in a low boiling solvent, for example, to a solution of the polymer in tetramethyl urea. Plasticized articles can then be prepared either by extruding the solution into a coagulating bath which does not dissolve the plasticized or by dry spinning or casting the solution under conditions which do not cause the evaporation of the plasticizer.

At the same time, it is also characteristic that the solvents of this invention are useful, not only in connection with polyvinylidene chloride but also with copolymers of vinylidene chloride with other polymerizable substances such as, for example, compounds containing one or more ethylenic linkages including vinyl and acrylic compounds as well as olefinic or diolefinic hydrocorbons such as isobutylene, butadiene, etc. They are satisfactory for use with those polymers that contain an appreciable amount of vinylidene chloride, for example, polymers and copolymers that contain at least 95% by weight of vinylidene chloride. Since the introduction of other monomers generally makes for greater solubility, the solvents of this invention are usually effective in dissolving polymers or interpolymers of vinylidene chloride which contain less than 95% of vinylidene chloride.

The bulk or mass polymerization process is generally used to polymedize vinylidene chloride. The monomer may also be polymerized in a non-polymerizable solvent by the solution polymerization process. These processes are generally known to those skilled in the art and are capable of many variations. Further information concerning polymerization procedures for vinylidene chloride may be obtained from any standard text book, such as, for example, "The Technology of Plastics and Resins," by J. Phillip Mason and Joseph F. Manning.

The solution of vinylidene chloride polymer, as disclosed herein, must be of such a concentration that its viscosity at the operating temperature is within a workable range. When it is to be employed in the spinning of yarn or the casting of film, the solution should preferably have a viscosity within the range of 25 to 500 poises. This requires a polymer having a molecular weight in excess of 5,000 to 10,000 which value constitutes the approximate lower limit of the useful range of molecular weight. Generally, solutions containing 10% to 40% by weight of polymer find ready application.

The compounds containing the solvogenic groups described above are capable of dissolving at least 20% to 30% by weight of the various polymers and, in many cases, are miscible in all proportions. Also, the higher boiling solvents may be used as plasticizers to the extent that they will constitute as much as 35% by weight of the plasticized polymeric material or even more if desired.

The temperatures used in preparing the various compositions of this invention depend in part upon the boiling points and the effectiveness of the particular solvents. Thus, temperatures up to about 200° C. may be employed. Solutions may be prepared in an atmosphere of inert gas and vacuum or other suitable techniques may be employed to degassify the resultant new compositions prior to their use.

Yarns and films and similar structures of polyvinylidene chloride prepared from modified or unmodified solutions can be stretched to yield oriented structures possessing a high tenacity, a desirable elongation and a good elastic recovery. The articles are not contaminated with undesirable salts and are substantially free of void spaces.

As indicated previously, these solutions are very useful for the manufacture of shaped structures such as yarns, films, moulded articles, lacquers, coating compositions, etc. This is an improvement over the prior art in that the previously known solvents were not suited for the production of either lacquers or coating compositions from polyvinylidene chloride. Such coating compositions are especially useful in the coating of wire and electrical parts because of the high chemical and electrical resistance of the polymer.

Shaped articles formed from polyvinylidene chloride as defined in this invention are very resistant to heat, chemical action and common solvents. Since high vinylidene chloride content polymers have a much greater form and heat stability, oriented yarns do not retract on heating to nearly so great an extent as do yarns or monofils made from the interpolymers of the prior art.

Since it is obvious that many changes and

I claim:

1. As a new composition of matter, a polymer of vinylidene chloride containing in the polymer molecule at least 95% by weight of vinylidene chloride and an amide selected from the group consisting of N,N-diethylacetamide, N,N-dibutyllauramide, N,N-diphenyllauramide, N,N-diphenylcrotonamide, N,N-dimethyl methyl carbamate, N,N-dimethylmethoxyacetamide, N,N,N',N'-tetramethyladipamide, N,N,N',N'-tetraethyladipamide, N,N,N',N'-tetramethyloxamide, tetramethylurea and N-acetylpiperidine.

2. As a new composition of matter, a polymer of vinylidene chloride containing in the polymer molecule at least 95% by weight of vinylidene chloride dissolved in a solvent comprising an amide selected from the group consisting of N,N-diethylacetamide, N,N-dibutyllauramide, N,N-diphenyllauramide, N,N-diphenylcrotonamide, N,N-dimethyl methyl carbamate, N,N-dimethyl methoxy acetamide, N,N,N',N'-tetramethyladipamide, N,N,N',N'-tetraethyladipamide, N,N,N',N'-tetramethyloxamide, tetramethyl urea and N-acetyl piperidine.

3. A new composition of matter as defined in claim 2 in which the polymer is polyvinylidene chloride.

4. A new composition of matter as defined in claim 2 in which the polymer has a molecular weight in excess of 5,000.

5. A new composition of matter as defined in claim 2 in which the solution has a viscosity within the range of 25 to 500 poises.

6. The composition of claim 2 in which the solution contains at least 10% of said polymer of polyvinylidene chloride.

7. As a new composition of matter, a polymer of vinylidene chloride containing in the polymer molecule at least 95% by weight of vinylidene chloride dissolved in N-acetyl piperidine.

8. A new composition of matter as defined in claim 7 in which the polymer is polyvinylidene chloride.

9. The composition of claim 7 in which the solution contains at least 10% of said polymer of vinylidene chloride.

10. The composition of claim 7 in which the polymer has a molecular weight of at least 5,000.

11. The composition of claim 7 in which the solution has a viscosity within the range of 25 to 500 poises.

12. As a new composition of matter a polymer of vinylidene chloride containing in the polymer molecule at least 95% by weight of vinylidene chloride dissolved in tetramethyl urea.

13. A new composition of matter as defined in claim 12 in which the polymer is polyvinylidene chloride.

14. The composition of claim 12 in which the solution contains at least 10% of said polymer of vinylidene chloride.

15. The composition of claim 12 in which the polymer has a molecular weight of at least 5,000.

16. The composition of claim 12 in which the solution has a viscosity within the range of 25 to 500 poises.

17. As a new composition of matter a polymer of vinylidene chloride containing in the polymer molecule at least 95% by weight of vinylidene chloride dissolved in N,N,N',N'-tetramethyl adipamide.

18. A new composition of matter as defined in claim 17 in which the polymer is polyvinylidene chloride.

19. The composition of claim 17 in which the solution contains at least 10% of said polymer of vinylidene chloride.

20. The composition of claim 17 in which the polymer has a molecular weight of at least 5,000.

21. The composition of claim 17 in which the solution has a viscosity within the range of 25 to 500 poises.

RAY CLYDE HOUTZ.

REFERENCES CITED

The following references are of record in the file of this patent:

UNITED STATES PATENTS

| Number | Name | Date |
| --- | --- | --- |
| 2,404,724 | Houtz | July 23, 1946 |